(12) United States Patent
Arvelakis

(10) Patent No.: US 10,894,919 B2
(45) Date of Patent: Jan. 19, 2021

(54) METHODOLOGY FOR UPGRADING AND CLEANING OF USED TIRES, WASTE LUBRICANTS AS WELL AS ANY KIND OF OILS AND FATS FOR UTILIZATION AS FEEDSTOCK IN THERMOCHEMICAL CONVERSION PROCESSES

(71) Applicant: Stylianos Arvelakis, Athens (GR)

(72) Inventor: Stylianos Arvelakis, Athens (GR)

(*) Notice: Subject to any disclaimer, the term of this patent is extended or adjusted under 35 U.S.C. 154(b) by 15 days.

(21) Appl. No.: 16/066,308

(22) PCT Filed: Dec. 24, 2016

(86) PCT No.: PCT/IB2016/057998
§ 371 (c)(1),
(2) Date: Jun. 27, 2018

(87) PCT Pub. No.: WO2017/115261
PCT Pub. Date: Jul. 6, 2017

(65) Prior Publication Data
US 2019/0016959 A1    Jan. 17, 2019

(30) Foreign Application Priority Data
Dec. 28, 2015 (GR) ............... 20150100559

(51) Int. Cl.
*C10G 1/10* (2006.01)
*C10M 175/00* (2006.01)
*B09B 3/00* (2006.01)
*B09B 5/00* (2006.01)
*C11B 3/00* (2006.01)
(Continued)

(52) U.S. Cl.
CPC .......... *C10G 1/10* (2013.01); *B01D 11/00* (2013.01); *B09B 3/0016* (2013.01); *B09B 5/00* (2013.01); *C10G 1/04* (2013.01); *C10M 175/0016* (2013.01); *C11B 3/001* (2013.01); *C11B 3/006* (2013.01); *C11B 3/04* (2013.01); *C11B 13/00* (2013.01); *B01D 2257/60* (2013.01); *C10G 2300/1003* (2013.01); *C10G 2300/1007* (2013.01); *C10G 2300/201* (2013.01); *C10J 2300/0903* (2013.01); *C10J 2300/0946* (2013.01); *Y02E 50/10* (2013.01);
(Continued)

(58) Field of Classification Search
None
See application file for complete search history.

(56) References Cited

U.S. PATENT DOCUMENTS

| | | | |
|---|---|---|---|
| 6,348,143 B1* | 2/2002 | Serikawa | B01J 3/04 204/242 |
| 2013/0055632 A1* | 3/2013 | Petry | C10B 19/00 44/605 |
| 2014/0014592 A1* | 1/2014 | Koukios | C10G 1/047 210/748.02 |

* cited by examiner

Primary Examiner — Philip Y Louie
Assistant Examiner — Alyssa L Cepluch
(74) Attorney, Agent, or Firm — Skokos Law Group, LLC; Soula Skokos

(57) ABSTRACT

A methodology for cleaning and upgrading any kind of tires (cars, motorcycles, trucks, etc.), any kind of waste lubricants (internal combustion engines, industrial parts), any kind of oils as well as plant and animal fats by means of removal of the inorganic elements (potassium, sodium, chlorine, sulfur, phosphorus and heavy metals such as Pb, Cu, Cd, Zn, Hg, Mn, etc.) and the simultaneous addition of new such as calcium, magnesium and ammonium, in order to produce a clean and upgraded rubber material, lubricant as well as fat/oil, which can be used as raw material in thermochemical conversion processes such as flash (t<1 sec)/fast pyrolysis.

16 Claims, 1 Drawing Sheet

Prototype pressurized reactor for pretreatment process

(51) Int. Cl.
*C11B 3/04* (2006.01)
*C10G 1/04* (2006.01)
*B01D 11/00* (2006.01)
*C11B 13/00* (2006.01)

(52) U.S. Cl.
CPC ............. *Y02E 50/30* (2013.01); *Y02P 20/143* (2015.11); *Y02W 30/74* (2015.05)

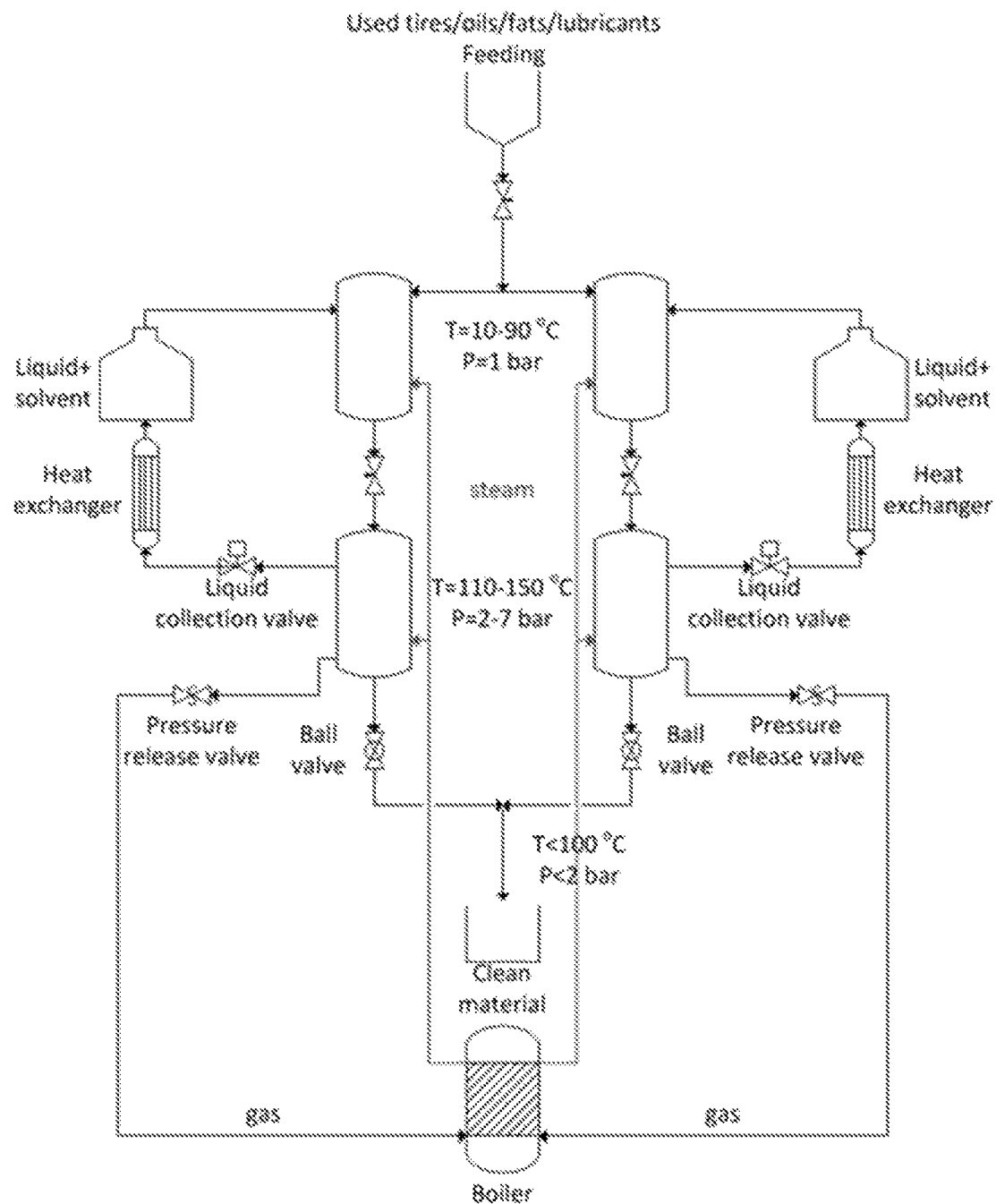
Prototype pressurized reactor for pretreatment process

METHODOLOGY FOR UPGRADING AND CLEANING OF USED TIRES, WASTE LUBRICANTS AS WELL AS ANY KIND OF OILS AND FATS FOR UTILIZATION AS FEEDSTOCK IN THERMOCHEMICAL CONVERSION PROCESSES

The present invention refers to the application of a methodology for cleaning and upgrading any kind of tires (cars, motorcycles, trucks, etc.), any kind of waste lubricants (internal combustion engines, industrial parts), any kind of vegetable oils and fats as well as animal fats by means of removal of the inorganic elements (potassium, sodium, chlorine, sulfur, phosphorus and heavy metals such as Pb, Cu, Cd, Zn, Hg, Mn, etc.) and the simultaneous addition of new such as calcium, magnesium and ammonium, in order to produce a clean and upgraded rubber material as well as fat/oil, which can be used as feedstock in thermochemical conversion processes such as flash (t<1 sec)/fast pyrolysis (1<t<10 sec), as well as in the gasification for the production of hydrogen-rich gas and liquid hydrocarbons which can be further upgraded by applying commercially available thermochemical conversion technologies for the production of pure hydrogen, liquid fuels, chemicals and energy with great economic and environmental benefits.

The excessive use of fossil fuels such as coal, oil and natural gas nowadays for energy/heat production as well as liquid and solid/gaseous transportation fuels causes major environmental problems such as emissions of sulfur and nitrogen oxides, particulates, heavy metals, methane and carbon dioxide. Additionally, the mining processes cause pollution of the local environment and especially of water, air and soil.

Aiming to reduce the gaseous/liquid and solid emissions caused by the use of conventional fuels and especially, to reduce emissions of gases that contribute to the greenhouse effect, the use of renewable energy sources such as wind, solar, hydro and biomass is encouraged. Especially the use of biomass in solid and liquid form to produce liquid and gaseous biofuels which will not contribute to the greenhouse effect is highly important for solving that problem. Animal and vegetable fats as well as vegetable oils such as margarine, seed oils (corn, soy, sunflower, etc.), waste cooking oil, live animal fats, etc., are currently used to produce liquid fuels such as biodiesel by means of transesterification process. This method produces liquids that can only be utilized as oil substitutes usually mixed with oil using specific ratio to avoid problems in internal combustion engines, while it produces by-products such as glycerin which is not easily provided at affordable prices in order to reduce the process cost. The relatively high price of oils/fats and the large price fluctuation of liquid fuels make this technology slightly profitable and dependent on existing subsidies. It is therefore clear that the production of more efficient fuels and chemicals using fats and oils is necessary by applying other technologies. Attempts have been made for flash/fast pyrolysis of fats and oils to produce hydrogen rich gas and hydrocarbons but with limited success due to low conversion which does not exceed usually 50%, but also because of the existing inorganic elements such as potassium, sodium, chlorine, sulfur, in fats and oils, which limit the conversion, and cause problems in the further processing of the gaseous and liquid product for end-products generation. Some catalytic technologies convert fats and oils directly into liquid fuels by hydrogen treatment while other catalytic techniques have also been tested having question able results mainly due to small yields, process complexity that leads to increased costs and due to inorganic elements effect on the applied process.

In addition, the recycling and recovery of used tires is nowadays one of the biggest environmental problems worldwide. Every year, millions of tons of used tires require safe as well as economically viable disposal and recovery. The most common disposal method is storing in dumps followed by recycling to produce new materials. Combustion in cement industries for the production of energy is also used as well as pyrolysis to produce energy, fuels and materials. However, the high content of tires in sulfur that can exceed 1% weight basis combined to their low effectiveness and low pyrolysis yields make these solutions impossible to be implemented on a large scale. Similar problems occur when recycling and recovery of waste lubricants takes place, the emission of which to the environment poses a great threat.

The purpose of the present invention is to achieve the upgrading and purification of used tires, any kind of waste lubricants (internal combustion engines, industrial parts), any kind of oils as well as vegetable and animal fats by removing harmful inorganic elements such as potassium, sodium, chlorine, sulfur, phosphorus and heavy metals such as cadmium, chromium, nickel, lead, etc., and/or by deactivating them so that they do not adversely affect the thermochemical conversion processes such as flash/fast pyrolysis and gasification which are used to produce gaseous/liquid hydrocarbons in case of pyrolysis and gas in case of gasification, which can be used for the production of pure hydrogen and/or liquid fuels/chemicals having zero foot print regarding greenhouse gas emissions and high financial value.

The invention is defined in independent claim 1. Features of the dependent claims add further advantages to the invention.

The intended purpose as surprisingly found in the laboratory is achieved by leaching of used tires, any kind of waste lubricants (internal combustion engines, industrial parts), as well as any kind of oils and fats with aqueous solutions of inorganic and/or organic salts. Mixtures of both organic and inorganic acids/salts can also be used in the process to achieve the desired result considering that the proportion of acid is limited to less than 30% of the total mixture on a weight basis. The leaching process can take place at atmospheric or elevated pressure.

It is widely known that used tires, waste lubricants, as well as oils and fats have little or no mixing ability with water, thus the reaction possibility between the two phases is generally considered as impossible. Therefore we found greatly surprised that under certain conditions, it is possible to use aqueous salt solutions for removing the inorganic elements from the treated used tires, waste lubricants and fats and oils as well as enriching them with elements (Ca, Mg, $NH_4$) which turned out to play an important role in both the conversion of the treated used tires, waste lubricants and fats and oils to gaseous and liquid mixtures of hydrocarbons and to the removal/absorption of harmful inorganic elements (K, Na, Cl, S, P, heavy metals) which can adversely affect the conversion of used tires, fats and oils to novel gas/liquid products.

When atmospheric leaching is performed, commercial reactors are applied, which are already in use in various industrial applications and in any application that requires liquid/liquid and/or solid/liquid extraction.

The existence of a stirring system and/or intensive solid/liquid and liquid/liquid mixing is necessary for having rapid reaction and effective removal of alkali metals, chlorine, sulfur, phosphorus and heavy metals with a short residence time of the material in the reactor.

In case of used tires, size reduction of the material below 10 mm and preferably below 2 mm is required as well as the removal of the inner steel housing prior to treatment. These operations are carried out by using commercially available grinding equipment as well as magnetic separators.

As organic and/or inorganic compounds, can be used any water-soluble organic/inorganic salts of calcium, magnesium and ammonium in proportions of 0.07% up to 1.5% weight basis in aqueous solution in case of fats and oils while in case of used tires, it typically ranges between 0.1-4% weight basis. Although the use of higher concentrations of salts in the solutions is feasible, it is not considered as necessary to achieve the desired result.

Examples are salts of calcium acetate/citrate/nitrate and/or magnesium acetate/citrate/nitrate and/or ammonium acetate/citrate/nitrate. Also acetic acid, citric acid, nitric acid can be used. When magnesium and/or ammonium salts are used, the addition of calcium salt to the mixture ranging from ⅒ up to ⅓ of the total salts concentration is always recommended for better results. However, the calcium salts can be used separately without the presence of other salts. Additionally, titanium, zirconium, yttrium, aluminum salts can be used in the leaching process, although due to the cost and the highly successful treatment using the aforementioned salts, their application could be avoided.

Furthermore, salts as well as acids/salts mixtures can be used in sequential order for executing successive extractions to achieve the desired result.

The applied ratios as well as the use of successive extractions or not depend on the type and composition of the pretreated material (e.g. rubber, clean oil, used oil, animal fat, lubricant, etc.) as well as on the desired properties which are going to be applied to the pretreated material. Regarding the creation of the aqueous solution, any kind of water from the public water system, source, etc., can be employed. The oil-fatty/aqueous phase ratio can range from 15 grams per liter to 800 grams per liter at temperature between 10° C. and 99° C. and residence time ranging from 5 minutes to 30 minutes. The best results can be achieved by applying oil-fatty/aqueous phase ratio ranging from 140 grams per liter to 800 grams per liter at temperature between 20° C. and 45° C. and residence time ranging from 5 minutes to 20 minutes by ensuring vigorous agitation in the reactor and/or intense mixing conditions of the pretreated material with the aqueous solution. Although extension of the reaction time beyond the limit of 30 minutes is feasible, it is not considered as necessary to achieve the desired result. In case of plant/animal fats, the reaction temperature must be sufficient to melt the treated fat therefore the recommended temperature ranges between 40-80° C. In case of used tires, the conditions remain the same as in the case of fats and oils with the exception of the solid/liquid ratio which can range from 15 grams per liter to 700 grams per liter. During the treatment with the aqueous solution of the organic and/or inorganic solvent which is created by mixing the specific organic and/or inorganic water-soluble salts and/or acids, the alkali metals (K, Na), sulfur, phosphorus, the heavy metals (Cu, Pb, Zn, Cr, Hg, etc.) as well as the chlorine present in the structure of used tires, fats and oils and/or dissolved in the oil/fatty phase are transferred into the aqueous phase and are removed from the pretreated material mainly as inorganic/organic salts.

Simultaneously, cations such as Ca, Mg, $NH_4$, etc., replace hydrogen atoms inside the structure of used tires, fats and oils and/or are simply embodied in the oil/fatty phase thereby increasing the concentration of these cations in treated fats and oils. This is concluded to have a surprisingly positive effect on the thermochemical conversion reactions such as flash/fast pyrolysis which favors the production of purified hydrogen-rich gas, and/or pure liquid phase hydrocarbons with high conversion efficiency which can be further used for the production of pure hydrogen and liquid fuels/chemicals with low financial cost.

Leaching can also be carried out by applying elevated pressures and temperatures and by using special reactors. In that case, the reactor illustrated in FIGURE is specifically designed for this process and is considered the optimum solution. For this case, the reaction is carried out at temperature between 110-150° C. and pressure 2-7 atm so that the aqueous phase remains in liquid form and is not converted to gas. Although higher temperatures (150-300° C.) and pressures 7-100 atm could be used, the financial cost of such an option combined with the small additional benefits for the process itself, make such a choice unprofitable. The reaction time is now limited below 5 minutes, the oil-fatty/aqueous phase ratio can range from 15 grams per liter to 800 grams per liter while the inorganic and/or organic salts concentration remains below 1.5% weight basis where better results are obtained for concentrations of 0.5-1% weight basis. The same inorganic and/or organic salts and acids used at atmospheric conditions can also be applied in case of elevated pressures.

As depicted in FIGURE, the high pressure reactor consists of two separate reactors in a parallel mode. Each reactor contains an initial mixing vessel where the aqueous as well as the oil/fatty phase are mixed with organic and/or inorganic solvents at temperatures between 50-80° C. having oil-fatty/aqueous phase ratio from 15 grams per liter up to 800 grams per liter for 1-3 minutes depending on whether we have oil or fat mixing. Consequently, the solution is fed to the pressurized reactor using a pressure pump where the conditions are already 110-150° C. and 2-7 atm. The treated material reaction is now shorter than 5 minutes followed by the immediate expansion of the solution in a cooling pressurized tank where the solution temperature is instantly limited to 70° C. to prevent evaporation of the aqueous phase.

Simultaneously, the parallel reactor operates one step back from the initial reactor in order to realize a process which is semi-batch but in progress at any time.

In case of used tires, exactly the same conditions are applied regarding pressure, pressurized reactor temperature as well as the residence time of the solid/liquid solution in the initial mixing tank. The solid/liquid ratio ranges now as previously from 15 grams per liter to 750 grams per liter, while the solvent concentration in the aqueous solution ranges from 0.5% to 4% weight basis.

As shown in FIGURE, each pressurized vessel is equipped with a second direct discharge valve which communicates with the interior of the reactor via a pipeline at the end of which there is a 40 micron diameter solids filter. The immediate depressurization caused by the discharge valve opening after the end of the treatment process results in solid/liquid separation letting the liquid to be concentrated and cooled in the recover tank before being recycled into the process as shown in FIGURE while the solid product is removed in the second phase by opening the valve of the pressurized reactor's bottom.

The conditions inside the pressurized reactor are always neutral/alkaline depending on the use of suitable solvents. This fact combined with the low pressure (2-7 atm) and temperatures (110-150° C.) results in the use of much cheaper materials such as carbon steel for manufacturing the pressurized reactors so that the process cost, both capital and operating, appears to be reduced by 50-80% compared to reactors that use much higher temperatures and pressures.

The application of pressurized reactors is recommended when the treated material is animal fats with a relatively high dew point (>80° C.) as in case of waste tires and also due to the fact that higher pressures and temperatures favor the solvents effect and their reaction not only with both used tires and oil/fatty phase but also with the inorganic elements (K, Na, Cl, S, P, heavy metals) present there. The final choice between atmospheric and pressurized treatment depends on the treated material and on the end use of the produced pure/upgraded material.

After the end of the leaching pretreatment process, either atmospheric or at elevated pressure, the fatty/oil phase is separated from the aqueous phase by using gravity separation tanks or by using centrifugation. The produced pure/upgraded oil/fat is further used as raw material in flash (t<1 sec) fast pyrolysis (1<t<10 sec) reactors, gasifiers and boilers for the production of hydrogen rich gases, pure hydrogen, liquid fuels/chemicals as well as electricity/heat.

The case of waste lubricants is the same as the case of fats/oils while the same treating conditions are applied, either atmospheric or at elevated pressure.

The liquid phase in each case is being recycled in order to be used again in the pretreatment process. Purification of the liquid phase from inorganic elements such as potassium, sodium, phosphorus, sulfur, chlorine, heavy metals is carried out after several loops using ion exchange resins when sign of saturation of the aqueous solution with the specific components is occurred.

The following examples are presented in order to indicate the effect of the invention on used tires and various oils and fats.

EXAMPLE 1

Used motorcycle tires are treated at atmospheric conditions utilizing calcium nitrate as solvent. The applied conditions are the following: temperature 80° C., solid/liquid ratio 15% w/w dry basis, agitator use at 500 rpm, leaching time 20 minutes, solvent concentration 3% w/w, material particle size <5 mm. After the pretreatment, the sample is filtered and dried at 50° C. After the pretreatment, 1.5% weight increase of the treated dry material is noticed because of the calcium absorption by the material. Sample analysis by electron microscopy, SEM-EDX confirms the significantly increased calcium concentration in the sample as well as the absence of chlorine and alkali metals while the sulfur concentration appears to be significantly reduced by 10-20%. Then both the untreated and the treated material are used in fast pyrolysis tests (t=2 sec) at 600° C. and 800° C. These tests showed that the material conversion into gaseous and liquid products as increased from 35.7 to 62.5% at 600° C. and from 75 to 91.1% at 800° C. after pretreatment. At the same time, although $SO_2$ was produced in the final gaseous and liquid products during pyrolysis of the raw material, there was no presence of $SO_2$ in case of the treated material. Additionally, the production of liquid hydrocarbons appears to be decreased by more than 70% in case of the treated sample while the primary end product is a gas mixture rich in $H_2$, CO, $CH_4$, and other hydrocarbons.

EXAMPLE 2

Used motorcycle tires are treated at elevated pressure using the reactor shown in FIGURE utilizing calcium chloride as solvent. The applied conditions are the following: temperature 140° C., pressure 7 atm, solid/liquid ratio 25% w/w dry basis, leaching time 4.5 minutes, solvent concentration 4% w/w, material particle size <5 mm. After the pretreatment, the sample is dried at 50° C. After the pretreatment, 1.9% weight increase of the treated dry material is noticed because of the calcium absorption by the material. Sample analysis by electron microscopy, SEM-EDX confirms the significantly increased calcium concentration in the sample as well as the absence of chlorine and alkali metals while the sulfur concentration appears to be significantly reduced by 15-30%. Then both the untreated and the treated material are used in fast pyrolysis tests (t=2 sec) at 600° C. and 800° C. These tests showed that the material conversion into gaseous and liquid products was increased from 35.7 to 73% at 600° C. and from 75 to 93% at 800° C. after pretreatment. At the same time, although $SO_2$ was produced in the final gaseous and liquid products during pyrolysis of the raw material, there was no presence of $SO_2$ in case of the treated material. Additionally, the production of liquid hydrocarbons appears to be decreased by more than 80% in case of the treated sample while the primary end product is a gas mixture rich in $H_2$, CO, $CH_4$, and other hydrocarbons.

EXAMPLE 3

Waste cooking oil from waste cooking oil recycling company RENOVOIL is treated at atmospheric conditions utilizing calcium acetate as solvent. The applied conditions are the following: temperature 30° C., oil/liquid ratio 25% weight basis, agitator use at 500 rpm, leaching time 20 minutes, solvent concentration 3% w/w. After the pretreatment, the sample is separated from the liquid phase using a separating funnel. The concentrations of chlorine, sulfur, alkali metals, calcium, magnesium, heavy metals, etc., in both raw and treated oil are determined by using ion chromatography and ICP-AES. The results show 99.9% chlorine removal, more than 35% sulfur removal, alkali metals removal by more than 55% for sodium and 99% for potassium while heavy metals removal such as V, Cu, Ba, Mo, Mn ranges from 30-80%. At the same time, the calcium concentration in the treated oil is significantly increased. Then both the untreated and the treated material are used in fast pyrolysis tests (t=2 sec) at 600° C. and 800° C. These tests showed that the material conversion into gaseous and liquid products was increased from 40 to 75% at 600° C. and from 55 to 90% at 800° C. after pretreatment. At the same time, although $SO_2$ was produced in the final gaseous and liquid products during pyrolysis of the raw material, there was no presence of $SO_2$ in case of the treated material.

Additionally, the production of liquid hydrocarbons appears to be decreased by more than 75% in case of the treated sample for both temperatures while the primary end product is a gas mixture rich in $H_2$, CO, $CH_4$, and other hydrocarbons

EXAMPLE 4

Waste cooking oil from waste cooking oil recycling company RENOVOIL is treated at elevated pressure using the reactor shown in FIGURE utilizing calcium chloride as solvent. The applied conditions are the following: temperature 140° C., pressure 6 atm, oil/liquid ratio 25% weight basis, leaching time 4.5 minutes, solvent concentration 2.5% w/w. After the pretreatment, the sample is separated from the liquid phase using a separating funnel. The concentrations of chlorine, sulfur, alkali metals, calcium, magnesium, heavy metals, etc., in both raw and treated oil are determined by using ion chromatography and ICP-AES. The results show 99.9% chlorine removal, more than 35% sulfur removal, alkali metals removal by more than 55% for sodium and 99% for potassium while heavy metals removal such as V, Cu, Ba, Mo, Mn ranges from 30-80%. At the same time, the calcium concentration in the treated oil is significantly increased. Then both the untreated and the treated material are used in fast pyrolysis tests (t=2 sec) at 600° C. and 800° C. These tests showed that the material conversion into gaseous and liquid products was increased from 40 to 75% at 600° C. and from 55 to 90% at 800° C. after pretreatment. At the same time, although $SO_2$, was produced in the final gaseous and liquid products during pyrolysis of the raw material, there was no presence of $SO_2$ in case of the treated material. Additionally, the production of liquid hydrocarbons appears to be decreased by more than 75% in case of the treated sample for both temperatures while the primary end product is a gas mixture rich in $H_2$, CO, $CH_4$, and other hydrocarbons.

EXAMPLE 5

Corn oil is treated at atmospheric conditions utilizing initially citric acid and then calcium acetate as solvent. Each wash is carried out separately while the treated material is separated from the first solvent using a separating funnel before being treated with the second. The applied conditions are the following: temperature 30° C. for citric acid and 20° C. for calcium acetate as solvents, oil/liquid ratio 25% weight basis, agitator use at 500 rpm, leaching time 20 minutes (10 minutes with the acid and 10 minutes with the acid salt), citric acid concentration 0.25% weight basis, calcium acetate concentration 0.2% weight basis. After the pretreatment, the sample is separated from the liquid phase using a separating funnel. The concentrations of chlorine, sulfur, alkali metals, calcium, magnesium, heavy metals, etc., in both raw and treated oil are determined by using ion chromatography and ICP-AES. The results show 99.9% chlorine removal, more than 40% sulfur removal, more than 25% phosphorus removal, alkali metals removal by more than 60% for sodium and 99% for potassium while heavy metals removal such as V, Cu, Ba, Mo, Mn ranges from 30-90%. At the same time, the calcium concentration in the treated oil is significantly increased. Then both the untreated and the treated material are used in fast pyrolysis tests (t=2 sec) at 600° C. and 800° C. These tests showed that the material conversion into gaseous and liquid products was increased from 45 to 73% at 600° C. and from 51 to 92% at 800° C. after pretreatment. Additionally, the production of liquid hydrocarbons appears to be decreased by more than 78% in case of the treated sample for both temperatures while the primary end product is a gas mixture rich in $H_2$, CO, $CH_4$, and other hydrocarbons.

EXAMPLE 6

Sunflower oil is treated at atmospheric conditions utilizing calcium acetate/magnesium acetate ratio: 60/40 as solvent. The applied conditions are the following: temperature 30° C., oil/liquid ratio 65% weight basis, agitator use at 500 rpm, leaching time 20 minutes, solvent concentration 4% weight basis. After the pretreatment, the sample is separated from the liquid phase using a separating funnel. The concentrations of chlorine, sulfur, alkali metals, calcium, magnesium, heavy metals, etc., in both raw and treated oil are determined by using ion chromatography and ICP-AES. The results show 99.9% chlorine removal, more than 30% sulfur removal, alkali metals removal by more than 75% for sodium and 99% for potassium while heavy metals removal such as V, Cu, Ba, Mo, Mn ranges from 30-85%. At the same time, the calcium as well as the magnesium concentration in the treated oil is significantly increased. Then both the untreated and the treated material are used in fast pyrolysis tests (t=2 sec) at 600° C. and 800° C. These tests showed that the material conversion into gaseous and liquid products was increased from 44 to 77% at 600° C. and from 49 to 89% at 800° C. after pretreatment. Additionally, the production of liquid hydrocarbons appears to be decreased by more than 80% in case of the treated sample for both temperatures while the primary end product is a gas mixture rich in $H_2$, CO, $CH_4$, and other hydrocarbons.

The invention claimed is:

1. A method for leaching a raw material comprising at least one selected from the group consisting of tires, waste lubricants, vegetable oils, and animal fats, the method comprising:
    a) contacting the raw material with an aqueous solution comprising a salt or salt mixture in a reactor under leaching conditions to remove inorganic elements of potassium, sodium, chlorine, sulfur, phosphorus, copper, lead, zinc, chromium, mercury, cadmium, manganese, nickel, vanadium, barium, and molybdenum while adding calcium, magnesium, aluminum and ammonium to produce an upgraded material, wherein:
        the salt or salt mixture comprises calcium and a total amount of salt or salt mixture in the aqueous solution is 0.5 to 4 wt %,
        the leaching conditions include a temperature of 110° C. to 250° C., a pressure of 2 to 45 atm, and a time of 1 min to 2 h, and
        a pH within the reactor is kept neutral or basic;
    b) separating an aqueous phase from the upgraded material.

2. The method according to claim 1, wherein the aqueous solution comprises at least one inorganic calcium salt and/or at least one organic calcium salt.

3. The method according to claim 1, wherein the raw material comprises tires.

4. The method according to claim 1, wherein the aqueous solution further comprises a magnesium salt and/or an ammonium salt.

5. The method according to claim 1, wherein step a) further comprises sequentially contacting the raw material with an aqueous solution comprising a magnesium salt and contacting the raw material with an aqueous solution comprising ammonium salt.

6. The method according to claim 1, wherein water from a public water system is employed to create the aqueous solution and a ratio of raw material to aqueous solution ranges from 15 grams per liter to 800 grams per liter.

7. The method according to claim 1, wherein the raw material comprises tires, water from a public water system is employed to create the aqueous solution, and a ratio of raw material to aqueous solution ranges from 15 grams per liter to 800 grams per liter.

8. The method according to claim 1, wherein a ratio of raw material to aqueous solution ranges from 140 grams per liter to 800 grams per liter.

9. The method according to claim 1, wherein the raw material comprises tires and a ratio of raw material to aqueous solution ranges from 140 grams per liter to 800 grams per liter.

10. The method according to claim 1, wherein the leaching time is 5 to 30 min.

11. The method according to claim 10, wherein step a) includes mixing the raw material and the aqueous solution and a leaching time of 5 to 20 minutes.

12. The method according to claim 1, wherein the temperature is 110° C. to 150° C. and the pressure is 2 to 7 atm.

13. The method according to claim 1, wherein any alkali metals, chlorine, sulfur, phosphorus, copper, lead, zinc, chromium, mercury, cadmium, manganese, nickel, vanadium, barium, and/or molybdenum present in the raw material are transferred to the aqueous phase during the contacting and are separated with the aqueous phase.

14. The method according to claim 1, further comprising separating at least a portion of an aqueous phase rich in at least one of alkali metals, chlorine, sulfur and phosphorus from the aqueous phase, wherein the at least a portion of the aqueous phase is used as liquid fertilizer.

15. The method according to claim 1, wherein the aqueous solution is fed to the reactor using a pressure pump.

16. The method according to claim 1, wherein the reactor comprises a direct discharge valve which communicates with an interior of the reactor via a pipeline with an end having a 40 micron diameter solids filter, and wherein the method further comprises:
   i) separating the aqueous phase from the upgraded material by passing the upgraded material through the direct discharge valve and solids filter to produce the aqueous phase and a solid phase,
   ii) cooling the aqueous phase in a tank to produce a cooled aqueous phase,
   iii) recycling at least a portion of the cooled aqueous phase to step a), and
   iv) removing the solid phase from the direct discharge valve by opening the direct discharge valve.

* * * * *